(12) United States Patent
Sillard et al.

(10) Patent No.: US 8,041,172 B2
(45) Date of Patent: Oct. 18, 2011

(54) TRANSMISSION OPTICAL FIBER HAVING LARGE EFFECTIVE AREA

(75) Inventors: Pierre Sillard, Le Chesnay (FR); Denis Molin, Draveil (FR); Louis-Anne De Montmorillon, Versailles (FR); Marianne Bigot-Astruc, Marcoussis (FR); Simon Richard, Villebon sur Yvette (FR)

(73) Assignee: Draka Comteq, B.V., Amsterdam (NL)

( * ) Notice: Subject to any disclaimer, the term of this patent is extended or adjusted under 35 U.S.C. 154(b) by 819 days.

(21) Appl. No.: 12/098,804

(22) Filed: Apr. 7, 2008

(65) Prior Publication Data
US 2011/0044595 A1   Feb. 24, 2011

(30) Foreign Application Priority Data
Apr. 6, 2007   (FR) ..................... 07 02545

(51) Int. Cl.
G02B 6/028   (2006.01)
G02B 6/00   (2006.01)
(52) U.S. Cl. ...................... 385/124; 385/147
(58) Field of Classification Search .......... 385/123, 385/124, 125, 126, 127
See application file for complete search history.

(56) References Cited

U.S. PATENT DOCUMENTS

| 4,852,968 | A | 8/1989 | Reed |
| 5,781,684 | A | 7/1998 | Liu |
| 6,483,975 | B1 | 11/2002 | Hsu et al. |
| 6,658,190 | B2 | 12/2003 | Hirano et al. |
| 6,665,482 | B2 | 12/2003 | Kawasaki et al. |
| 6,904,218 | B2 | 6/2005 | Sun et al. |
| 7,187,833 | B2 * | 3/2007 | Mishra ................ 385/127 |
| 2005/0244120 | A1 | 11/2005 | Mishra |
| 2009/0123122 | A1 | 5/2009 | Mukasa |
| 2009/0252470 | A1 | 10/2009 | Mukasa |
| 2010/0189400 | A1 * | 7/2010 | Sillard et al. ............. 385/127 |

FOREIGN PATENT DOCUMENTS

| EP | 1477831 A1 | 11/2004 |
| EP | 1978383 A1 | 10/2008 |

OTHER PUBLICATIONS

European Search Report in counterpart European Application No. 08005802, dated Jul. 21, 2008 {All documents listed in Search Report previously cited in IDS filed on Jun. 17, 2008].
Tsukitani M. et al., "Ultra Low Nonlinearity Pure—Silica—Core Fiber with an Effective Area of 211 $\mu m^2$ and Transmission Loss of 0.159 dB/km", M3.3.2, ECOC 2002, Sep. 9, 2002.

(Continued)

*Primary Examiner* — Akm Ullah
(74) *Attorney, Agent, or Firm* — Summa, Additon & Ashe, P.A.

(57) ABSTRACT

The present invention relates to a transmission optical fiber. The optical fiber includes, from its center to its periphery a central core, an intermediate cladding, and a depressed cladding. The optical fiber has an effective area ($S_{eff}$) of at least about 120 $\mu m^2$ at a wavelength of 1550 nm and an effective cutoff wavelength ($\lambda_{Ceff}$) of less than 1600 nm. The optical fiber has an effective area of more than 120 $\mu m^2$ with a cutoff wavelength limited to less than about 1600 nm without degradation of other optical parameters (e.g., attenuation losses and dispersion).

27 Claims, 2 Drawing Sheets

OTHER PUBLICATIONS

Ohsono, K., et al., "The Study of Ultra Large Effective Area Fiber & Mating Dispersion Slope Compensating Fiber for Dispersion Flattened Hybrid Optical Fiber DWDM Link", IWCS 2002, Nov. 18, 2002, pp. 483-487.

Aikawa K., et al., "Single—Mode Optical Fiber with Effective Core Area larger than 160 $\mu m^2$", ECOC 1999, Sep. 26, 1999, p. 1-302.

French Search Report and Written Opinion in corresponding French Application Serial No. 0702545, dated Dec. 14, 2007.

* cited by examiner

TRANSMISSION OPTICAL FIBER HAVING LARGE EFFECTIVE AREA

CROSS-REFERENCE TO PRIORITY APPLICATION

This application claims the benefit of pending French application Ser. No. 07/02545 (filed Apr. 6, 2007, at the French Patent Office) via 35 U.S.C. §119. French application Ser. No. 07/02545 is hereby incorporated by reference in its entirety.

FIELD OF THE INVENTION

The present invention relates to the field of optical fiber transmission and, more specifically, to a line fiber having an enlarged effective area without increasing the bending and microbending losses.

BACKGROUND OF THE INVENTION

For optical fibers, the refractive index profile is generally qualified in relation to a graph, plotting refractive index as a function of optical fiber radius. Conventionally, the distance r to the center of the optical fiber is shown along the abscissa (i.e., the x axis), and the difference between the refractive index at radius r and the refractive index of the outer optical cladding of the optical fiber is shown along the ordinate axis (i.e., the y axis). The outer optical cladding has a constant refractive index and usually consists of pure silica. The outer optical cladding, however, may also contain one or more dopants. The refractive index profile is referred to as a "step" profile, "trapezoidal" profile, or "triangular" profile for graphs having the respective shapes of a step, a trapezoid, or a triangle. These curves are generally examples of the theoretical or set profile of the optical fiber. The manufacturing stresses of the optical fiber may lead to a slightly different profile.

An optical fiber typically includes an optical core, whose function is to transmit and possibly to amplify an optical signal, and an optical cladding, whose function is to confine the optical signal within the core. For this purpose, the refractive indexes of the core $n_c$ and the outer cladding $n_g$ are such that $n_c > n_g$. As is well known, the propagation of an optical signal in a single-mode optical fiber is divided into a fundamental mode (i.e., dominant mode) guided in the core and into secondary modes (i.e., cladding modes) guided over a certain distance in the core-cladding assembly.

Conventionally, step-index fibers, also called single-mode fibers or (SMF), are used as a line fiber for transmission systems employing optical fibers. These optical fibers exhibit a chromatic dispersion and a chromatic dispersion slope meeting specific telecommunications standards, as well as normalized values for the effective area and the cutoff wavelength.

Typically, for terrestrial transmission systems, standard single-mode fibers (SSMF) are used, which have a positive dispersion (D) and a positive dispersion slope (P), an effective area (S) of about 80 $\mu m^2$ and an attenuation of about 0.19 dB/km (measured at a wavelength of 1550 nm). Submarine transmission systems with repeaters typically use hybrid transmission lines with optical fibers having a positive dispersion, a large effective area (about 100-110 $\mu m^2$), and a low attenuation (0.17-0.19 dB/km measured at a wavelength of 1550 nm), and optical fibers with negative dispersion.

Submarine transmission systems without repeaters typically use transmission lines that include combinations of optical fibers having a positive dispersion and an effective area of between 80 and 110 $\mu m^2$.

As known by those having ordinary skill in the art, an increase in the effective area of a transmission optical fiber contributes to the reduction of non-linear effects in the optical fiber. A transmission optical fiber having an enlarged effective area facilitates transmission over a longer distance and/or an increase in the functional bands of the transmission system. To increase the effective area of a transmission optical fiber, optical fiber profiles with an enlarged and flattened central core as compared to a conventional SSMF were proposed. Such a change in the shape of the central core of the optical fiber, however, leads to an increase in the bending and microbending losses and to an increase of the effective cutoff wavelength. The effective cutoff wavelength is conventionally measured as the wavelength at which the optical signal is single mode after propagation over two meters of optical fiber. This is defined by subcommittee 86A of the International Electrotechnical Commission under standard IEC 60793-1-44.

U.S. Pat. No. 6,658,190, which is hereby incorporated by reference in its entirety, describes a transmission optical fiber with an enlarged effective area of more than 110 $\mu m^2$. This optical fiber has a wide central core (11.5 $\mu m$-23.0 $\mu m$), that is 1.5× to 2× that of a SSMF and a configuration with a constant or slightly depressed cladding. To compensate for the increase in bending losses caused by an increase in the effective area, this patent proposes to increase the diameter of the optical fiber. See FIG. 29 of U.S. Pat. No. 6,658,190. Such an increase in the optical fiber diameter, however, involves costs and, in addition, causes cabling problems as the resulting fiber may be incompatible with other optical fibers. This patent further discloses that the cutoff wavelength decreases with the length of the considered optical fiber. (See FIG. 5 of U.S. Pat. No. 6,658,190.) Finally, this patent notes that the optical fiber reaches single-mode operation after one kilometer of transmission. Such a measurement of the cutoff wavelength, however, does not comply with the aforementioned normalized measurements.

The publication of Masao Tsukitani et al. entitled "Ultra Low Nonlinearity Pure-Silica-Core Fiber with an Effective Area of 211 $\mu m^2$ and Transmission Loss of 0.159 dB/km," M3.3.2, ECOC 2002, (Sep. 9, 2002), describes an optical fiber with a refractive index profile configuration having a wide and slightly depressed cladding adjacent to a central core. Such an optical fiber has an effective area of 211 $\mu m^2$ and low attenuation. To limit the bending losses, however, the diameter of the optical fiber was increased to 170 $\mu m$, (versus 125 $\mu m$ for a SSMF). This leads to significant manufacturing costs and problems of incompatibility with other optical fibers.

Optical fiber configurations for increasing the effective area were proposed in the publication of Kazumasa Ohsono et al. entitled "The Study of Ultra Large Effective Area Fiber & Mating Dispersion Slope Compensating Fiber for Dispersion Flattened Hybrid Optical Fiber DWDM Link," IWCS 2002, pp. 483-487, (Nov. 18, 2002), and in the publication of Kazuhiko Aikawa et al. entitled "Single-Mode Optical Fiber with Effective Core Area larger than 160 $\mu m^2$," ECOC 1999, pages 1-302, (Sep. 26, 1999).

Moreover, U.S. Pat. No. 6,665,482, which is hereby incorporated by reference in its entirety, proposes a pedestal refractive index profile for achieving an effective area of more than 90 $\mu m^2$. In its examples, however, the values of the effective area are less than 110 $\mu m^2$.

U.S. Pat. No. 5,781,684, which is hereby incorporated by reference in its entirety, describes a coaxial optical fiber having a large effective area for a dispersion-shifted fiber, also called Non-Zero Dispersion Shifted Fiber (NZDSF). This optical fiber has a cutoff wavelength that is too high for maintaining single-mode in the C+ band (1530 nm-1570 nm), and a mode field diameter that is too small (less than 11 µm at 1550 nm).

U.S. Patent Application Publication No. 2005/0244120, which is hereby incorporated by reference in its entirety, describes an optical fiber with a large effective area (>75 µm$^2$) and a low attenuation (<0.20 dB/km at 1550 nm). The optical fiber described in this publication has a refractive index profile with a central core, an intermediate cladding, and a depressed cladding. The depressed cladding, however, is too wide (7 µm to 7.4 µm) or not sufficiently buried (−0.1 percent) to achieve the combination of a large effective area and a low effective cutoff wavelength.

U.S. Pat. No. 6,483,975, which is hereby incorporated by reference in its entirety, describes an optical fiber with a large effective area (>100.0 µm$^2$) and a positive chromatic dispersion (>20 ps/(nm·km)). Several optical fiber refractive index profiles are described in this patent, including a profile with a central core, an intermediate cladding, and a depressed cladding. See FIGS. 5a-5b of U.S. Pat. No. 6,483,975. The depressed cladding, however, is too wide (width $r_3-r_2$ of between 15 µm and 19 µm) and too close to the central core (width of intermediate cladding $r_2-r_1$ of 2-4 µm) to achieve the optical characteristics desired by the present invention.

U.S. Pat. No. 4,852,968, which is hereby incorporated by reference in its entirety, describes an optical fiber having a refractive index profile with a depressed cladding. This patent aims to improve certain optical parameters of the optical fiber (e.g., the dispersion, confinement, and bending loss parameters) by the presence of a depressed cladding. This patent, however, does not mention the impact on the effective cutoff wavelength or on the effective area. Only a mode field diameter of 9.38 µm is mentioned, but this would lead to an effective area of less than 80 µm$^2$.

European Application No. 1,477,831 and its counterpart U.S. Pat. No. 6,904,218, which is hereby incorporated by reference in its entirety, describe an optical fiber with a large effective area (>80 µm$^2$) and a cutoff wavelength limited to 1310 nm. Several optical fiber profiles are described in these patent documents and, notably, a refractive index profile with a central core, an intermediate cladding, and a depressed cladding. See FIG. 8 of European Application No. 1,477,831. The depressed cladding, however, is too wide (about 15 µm) to achieve exceptional optical characteristics. Moreover, the outer diameter of the depressed cladding is large (about 33 µm), which involves significant manufacturing costs.

Therefore, there exists a need for a transmission of optical fiber that has an enlarged effective area of more than 120 µm$^2$ without degrading other optical fiber parameters (e.g., losses and dispersion), and that has effective cutoff wavelength of less than 1600 nm.

SUMMARY OF THE INVENTION

Accordingly, the present invention embraces an optical fiber profile that includes a central core, an intermediate cladding, and a depressed cladding. As compared with a typical standard single-mode fiber (SSMF) according to the ITU-T G.652 requirements, the central core is enlarged and flattened to thereby enlarge the effective area. The depressed cladding is sufficiently distant from the central core (i.e., separated by the intermediate cladding) to avoid strong perturbations of the fundamental mode. The depressed cladding is sufficiently buried and narrow to limit the bending and microbending losses and especially to control the cutoff wavelength. The propagation of leakage modes is also limited, if not avoided. The optical fiber according to the present invention has an effective area of more than 120 µm$^2$ at 1550 nm with a cutoff wavelength that guarantees the single-mode operation of the optical fiber in the C band, while bending or microbending losses are comparable to a typical SSMF according to the ITU-T G.652 standards.

The present invention proposes a transmission optical fiber that includes, from its center to its periphery, a central core, an intermediate cladding, a depressed cladding, and an outer optical cladding. Additional cladding layers (e.g., intervening cladding layers) may be positioned, for instance, between the depressed cladding and the outer optical cladding. As noted, the present transmission optical fiber has an effective area ($S_{eff}$) at 1550 nm equal to or more than 120 µm$^2$ and an effective cutoff wavelength ($\lambda_{Ceff}$) of less than 1600 nm.

In one exemplary embodiment, the invention is a transmission optical fiber that includes (i) a central core having a radius equal to or more than 5.5 µm and a refractive index difference with the outer optical cladding that is equal to or less than 5×10$^{-3}$; (ii) an intermediate cladding having an annular width of more than 5 µm and a refractive index difference with the outer optical cladding; and (iii) a depressed cladding having an annular width of less than 5 µm and a refractive index difference with the outer optical cladding equal to or less than −3.5×10$^{-3}$. As noted, this exemplary optical fiber has an effective area of equal to or more than 120 µm$^2$ at 1550 nm and an effective cutoff wavelength of less than 1600 nm.

According to other exemplary embodiments, the optical fiber according to the present invention may include one or more of the following characteristics:

the radius of the depressed cladding is less than or equal to 16 µm;

the refractive index difference between the intermediate cladding and the outer cladding is between about −1×10$^{-3}$ and 1×10$^{-3}$;

the mode field diameter is more than 11.5 µm at a wavelength of 1550 nm;

the chromatic dispersion is equal to or less than 21.5 ps/(nm·km) at a wavelength of 1550 nm;

the chromatic dispersion slope is equal to or less than 0.065 ps/(nm$^2$·km) at a wavelength of 1550 nm;

the attenuation is equal to or less than 0.19 dB/km at a wavelength of 1550 nm;

the bending losses are equal to or less than 20 dB/m for a bending radius of 10 mm at a wavelength of 1625 nm;

the microbending losses, at a wavelength of 1550 nm, are comparable to the microbending losses of a standard single-mode fiber (SSMF) (i.e., when subjected to identical stresses).

The foregoing, as well as other characteristics and advantages of the invention and the manner in which the same are accomplished, is further specified within the following detailed description and its accompanying drawings.

DETAILED DESCRIPTION

In one aspect (and with reference to FIG. 1), the present invention embraces a transmission optical fiber 10 that includes a core 11 having a radius $r_1$ (i.e., the central core region in which the optical signal to be transmitted is guided) and a cladding region for confining the optical signal in the core 11. The cladding region includes a first inner cladding 12 (i.e., the "intermediate cladding" having a radius $r_2$), a depressed second inner cladding (i.e., the "depressed cladding" having a radius $r_3$), and an outer cladding 14 (e.g., an external optical cladding having a radius $r_{oc}$). The transmission optical fiber has (i) an effective area ($S_{eff}$) of greater than about 120 µm² as measured at a wavelength of 1550 nm and (ii) an effective cutoff wavelength ($\lambda_{Ceff}$) of less than 1600 nm.

To define a nominal refractive index profile for an optical fiber, the index of the outer cladding is generally taken as a reference. The index values of the central core and of the claddings are then provided as index differences (i.e., $\Delta n_{1, 2, 3}$) with the outer cladding. The outer cladding is typically formed of silica, but may be doped to increase or reduce its refractive index (e.g., to modify the signal propagation characteristics).

Figure 2:
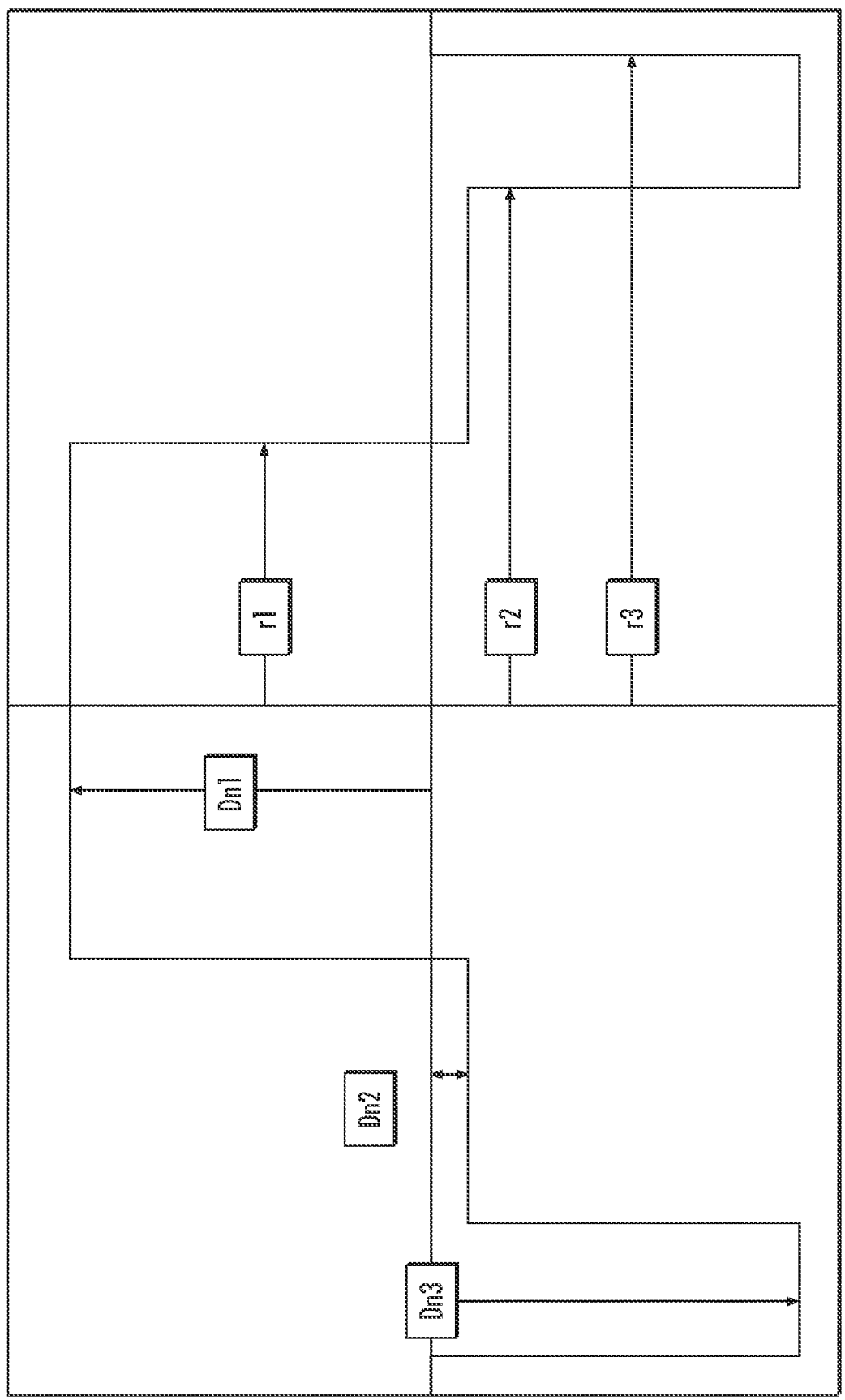
FIG. 2 schematically depicts the set profile of a step-index fiber according to the present invention.

FIG. 2 illustrates an exemplary set profile (i.e., a theoretical profile) of the optical fiber according to the present invention. The optical fiber actually achieved after drawing (i.e., from an optical preform) may have a slightly different profile.

Figure 1:
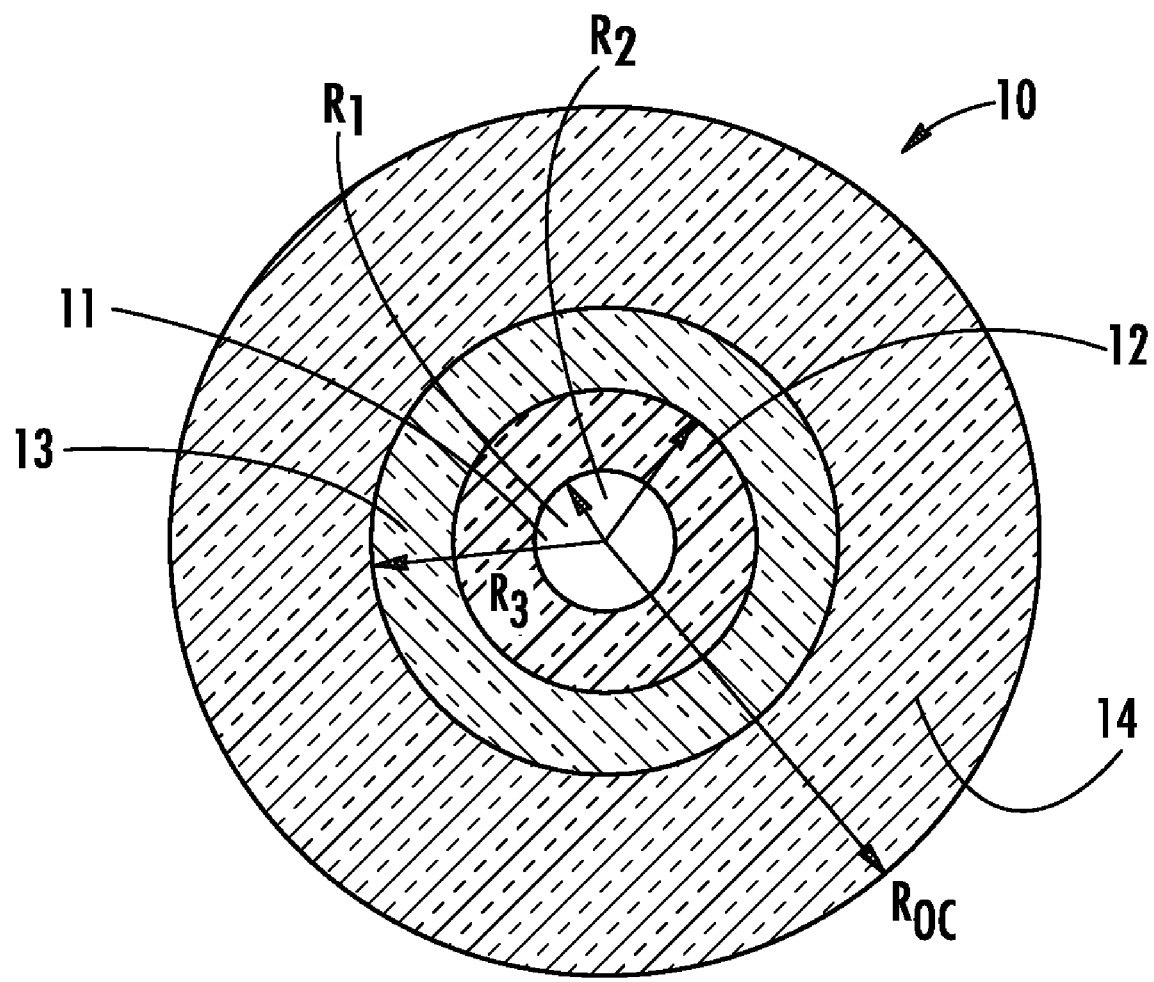
FIG. 1 schematically depicts a cross-section (not to scale) of an exemplary optical fiber according to the present invention.

As schematically depicted in FIGS. 1 and 2, the transmission optical fiber according to the present invention includes a central core 11 having a refractive index difference $\Delta n_1$ with the outer cladding 14, an intermediate (inner) cladding 12 having a refractive index difference $\Delta n_2$ with the outer cladding 14, and a buried or depressed (inner) cladding 13 having a refractive index difference $\Delta n_3$ with the outer cladding 14. The refractive indexes of the central core 11, the intermediate cladding 12, and the depressed cladding 13 are substantially constant over their entire widths.

The width of the central core 11 is defined by its radius $r_1$ and the widths of the intermediate cladding 12 and the depressed cladding 13 are defined by their respective outer radii $r_2$ and $r_3$. The width of the intermediate cladding 12 is defined by radius $r_2$ minus radius $r_1$. The width of the depressed cladding 13 (i.e., the buried cladding) is defined by radius $r_3$ minus radius $r_2$.

Typically, the central core, the intermediate cladding, and the depressed cladding are obtained by chemical vapor deposition (CVD) within a silica tube. The outer cladding is usually formed by overcladding the silica tube, such as with doped or undoped natural or synthetic silica. The outer optical cladding may also be obtained by any other deposition technique, including vapor axial deposition (VAD) or outside vapor deposition (OVD).

The optical fiber according to the present invention typically embraces a central core having a radius $r_1$ equal to or more than 5.5 µm, and a refractive index difference $\Delta n_1$ equal to or less than $5 \times 10^{-3}$ relative to the outer optical cladding (e.g., in silica). The central core of the optical fiber according to the present invention is, therefore, widened and flattened as compared with the central core of a SSMF having a radius $r_1$ of 4.35 and a refractive index difference of $\Delta n_1$ of $5.2 \times 10^{-3}$. At a wavelength of 1550 nm, for instance, the mode field diameter may thereby be enlarged to more than 11.5 µm (e.g., 12.0 µm or greater) and the effective area of the optical fiber may be increased to more than 120 µm².

The optical fiber according to the present invention also embraces an intermediate cladding having a radius $r_2$ and a refractive index difference $\Delta n_2$ with the outer cladding, and a depressed cladding having a radius $r_3$ and a refractive index difference $\Delta n_3$ with the outer cladding. The depressed cladding of the optical fiber according to the present invention is carefully controlled. The depressed cladding is sufficiently remote from the central core, (by the annular width of the intermediate cladding) such that it does not excessively perturb the propagation of the fundamental mode or otherwise influence the optical signal propagation characteristics. In addition, the depressed cladding is sufficiently deep and narrow to guarantee a reduction in the bending and microbending losses and to control the losses of the directly higher order mode (LP11), and thus the resulting cutoff wavelength. Moreover, the leakage mode behavior is limited or even avoided.

A width of the intermediate cladding ($r_2-r_2$) of more than 5 µm guarantees a sufficient distance of the depressed cladding from the central core such as not to perturb the fundamental mode in the central core. With a depth of the depressed cladding being equal to or more than $-3.5 \times 10^{-3}$ and a width of the depressed cladding ($r_3-r_2$) being less than 5 µm, the bending and microbending losses may be limited efficiently while controlling the cutoff wavelength, (i.e., limiting the propagation distance of the higher order modes in the optical fiber). By controlling the width and depth of the depressed cladding of the optical fiber in accordance with the present invention, it is possible to limit the effective cutoff wavelength of the optical fiber to 1600 nm while considerably enlarging the effective area for equivalent losses as compared with a conventional SSMF that complies with the ITU-T G.652 standards.

The following non-limiting examples compare transmission optical fibers according to the present invention with conventional optical fibers. (The data presented in Tables I and II are computer-simulated test results.)

Table I (below) provides six exemplary refractive index profiles for a transmission optical fiber according to the present invention (i.e., Examples 1, 2, 3, 4, 5, and 6), as well as typical threshold values and ranges according to the present invention. In addition, Table 1 provides core parameters for a conventional SSMF (i.e., compliant with the ITU-T G.652 standards) and two comparative examples (i.e., Examples 1b and 1c) that modify a profile parameter according to the present invention. In particular, Comparative Example 1b does not include a depressed cladding (i.e., $\Delta n_3$ is not less than 0) and Comparative Example 1c positions the depressed cladding too close to the core (i.e., the annular width of the intermediate cladding is narrow).

The first column assigns a reference to each profile. The following five columns provide the radius values for the core, the intermediate cladding, and the depressed cladding ($r_1$, $r_2$, and $r_3$) as well as their differences ($r_2-r_1$) and ($r_3-r_2$), which reflect the respective annular widths of the intermediate cladding and the depressed cladding. The last three columns provide the values for the refractive index differences for the core, the intermediate cladding, and the depressed cladding as compared with the refractive index of the outer cladding ($\Delta n_2$, $\Delta n_2$, and $\Delta n_3$). The refractive index values are measured at a wavelength of 633 nm. Each of exemplary optical fibers in Table I reflect an outer diameter of 125 µm. The values presented in Table I correspond to set profiles of optical fibers.

TABLE 1

| profile | $r_1$ (μm) | $r_2$ (μm) | $r_2-r_1$ (μm) | $r_3$ (μm) | $r_3-r_2$ (μm) | $\Delta n_1$ ($10^{-3}$) | $\Delta n_2$ ($10^{-3}$) | $\Delta n_3$ ($10^{-3}$) |
|---|---|---|---|---|---|---|---|---|
| invention | ≧5.5 | | >5 | | <5 | ≦5.0 | | ≦−3.5 |
| exemplary range | 5.5 to 7.5 | 10.5 to 14.0 | 5.0 to 8.0 | 11.5 to 16.0 | 1.0 to 5.0 | 3.0 to 5.0 | −1.0 to 1.0 | −15.0 to −3.5 |
| SSMF | 4.35 | — | — | — | — | 5.2 | — | — |
| 1 | 6.04 | 11.27 | 5.23 | 16.0 | 4.73 | 4.3 | 0.0 | −4.7 |
| 1b* | 6.04 | 11.27 | 5.23 | 16.0 | 4.73 | 4.3 | 0.0 | 0.0 |
| 1c* | 6.04 | 8.00 | 1.96 | 12.73 | 4.73 | 4.3 | 0.0 | −4.7 |
| 2 | 5.84 | 10.95 | 5.11 | 15.6 | 4.65 | 4.0 | 0.3 | −6.0 |
| 3 | 6.31 | 11.83 | 5.51 | 14.3 | 2.47 | 4.1 | −0.3 | −4.0 |
| 4 | 6.31 | 12.52 | 6.21 | 15.0 | 2.48 | 4.2 | −0.3 | −4.8 |
| 5 | 6.34 | 11.77 | 5.43 | 15.5 | 3.73 | 3.9 | 0.3 | −5.0 |
| 6 | 6.50 | 13.33 | 6.83 | 16.0 | 2.67 | 4.0 | −0.3 | −6.0 |

*comparative examples

The transmission optical fiber according to the present invention is illustrated, without limitation, by the six examples of Table 1 (above). It is noted that, as compared with a conventional SSMF according to the ITU-T G.652 standards, the optical fiber according to the present invention has a wider central core and a smaller refractive index difference (i.e., a central core having a radius $r_1$ equal to or more than 5.5 μm and a refractive index difference $\Delta n_1$ equal to or less than $5.0 \times 10^{-3}$ relative to the outer optical cladding). It is also noted that the optical fiber according to the present invention has a depressed cladding ($r_3$, $\Delta n_3$) that is separated from the central core by an intermediate cladding ($r_2$, $\Delta n_2$) having a width of at least 5 μm. Moreover, the depressed cladding is narrow, (e.g., less than 5 μm), and deeply buried by at least $-3.5 \times 10^{-3}$ relative to the outer optical cladding. The intermediate cladding may be in silica (i.e., having the same refractive index as the outer cladding) or in slightly doped silica, such that the refractive index difference ($\Delta n_2$) between the intermediate cladding and the outer optical cladding is between about $-1.0 \times 10^{-3}$ and $1.0 \times 10^{-3}$.

The optical fiber according to the present invention has a profile as described in Table 1 (above) with the following preferential characteristics:

The central core ($r_1$, $\Delta n_1$) has a radius $r_1$ between about 5.5 μm and 7.5 μm and a refractive index difference with the outer cladding $\Delta n_1$ between about $3.0 \times 10^{-3}$ and $5.0 \times 10^{-3}$.

The intermediate cladding ($r_2$, $\Delta n_2$) has a radius $r_2$ between about 10.5 μm and 14.0 μm for an annular width ($r_2-r_1$) between about 5 μm and 8 μm and a refractive index difference ($\Delta n_2$) with the outer cladding between about $-1.0 \times 10^{-3}$ and $1.0 \times 10^{-3}$.

The depressed cladding ($r_3$, $\Delta n_3$) has a radius $r_3$ between about 11.5 μm and 16.0 μm for an annular width ($r_3-r_2$) between about 1 μm and 5 μm and a refractive index difference $\Delta n_3$ with the outer cladding between about $-15.0 \times 10^{-3}$ and $-3.5 \times 10^{-3}$ (e.g., between about $-15.0 \times 10^{-3}$ and $-5 \times 10^{-3}$). It is also noted that the depressed cladding has an outer radius $r_3$ that is typically less than about to 16 μm. With such a small depressed-cladding radius, optical-preform manufacturing costs are reduced by reducing the deposition of doped silica within the substrate tube).

The transmission optical fiber according to the present invention, having a refractive index profile as described previously, has a large effective area with a limited effective cutoff wavelength and bending and microbending losses comparable to those of a conventional SSMF (i.e., compliant with the ITU-T G.652) at the useful wavelengths (e.g., at 1550 nm). The optical fiber according to the present invention also has an equivalent or even lower attenuation (e.g., as measured by optical time domain reflectometer or OTDR) than a conventional SSMF according to the ITU-T G.652 standards, with a controlled dispersion and dispersion slope that is not much stronger than such a conventional SSMF.

The following Table II (below) illustrates simulated optical characteristics for the transmission optical fibers corresponding to the refractive index profiles of Table I. In Table II, the first column repeats the references of Table I. The following five columns provide, for each optical fiber profile, the values of the effective cutoff wavelength ($\lambda_{Ceff}$, measured over two meters of optical fiber according to the current IEC standards), the effective area ($S_{eff}$ at a wavelength of 1550 nm), the mode field diameters ($2W_{02}$ at a wavelength of 1550 nm), the chromatic dispersion (D at a wavelength of 1550 nm), and the dispersion slope (P at a wavelength of 1550 nm). The last three columns provide, for each optical fiber profile, the values for the attenuation (Att at a wavelength of 1550 nm), the bending losses (PPC over a radius of 10 mm at a wavelength of 1625 nm), and the microbending losses (SpC at a wavelength of 1550 nm).

The values for the microbending losses (SpC) are relative values and are expressed relative to the losses in a typical SSMF that would be subject to the same stresses (i.e., for a 125-micron diameter optical fiber). In this regard and as noted, ITU-T G.652 defines compliance requirements for standard single-mode fibers. The microbending losses may be measured, for example, by a so-called fixed diameter drum method. This method is described in the technical recommendation of the International Electrotechnical Commission of subcommittee 86A under reference IEC TR-62221 and will not be described further herein.

TABLE II

| profile | $\lambda_{Ceff}$ (μm) | $S_{eff}$ @ 1550 nm (μm$^2$) | $2W_{02}$ @ 1550 nm (μm) | D @ 1550 nm (ps/nm · km) | P @ 1550 nm (ps/(nm$^2$ · km)) | Att @ 1550 nm (dB/km) | PPC (10 mm) @ 1625 nm (dB/m) | SμC @ 1550 nm (dB) |
|---|---|---|---|---|---|---|---|---|
| invention exemplary | <1,600 ≧1350 | ≧120 | >11.5 | ≦21.5 ≧16 | ≦0.065 ≧0.050 | ≦0.19 | ≦20 | ~1 |
| SSMF | <1,300 | 80 | 10.3 | 16.8 | 0.058 | ~0.19 | ~50 | 1 |

TABLE II-continued

| profile | $\lambda_{Ceff}$ (μm) | $S_{eff}$ @ 1550 nm (μm²) | $2W_{02}$ @ 1550 nm (μm) | D @ 1550 nm (ps/nm·km) | P @ 1550 nm (ps/(nm²·km)) | Att @ 1550 nm (dB/km) | PPC (10 mm) @ 1625 nm (dB/m) | SμC @ 1550 nm (dB) |
|---|---|---|---|---|---|---|---|---|
| 1 | <1,550 | 120 | 12.1 | 20.5 | 0.063 | <0.19 | <10 | ~1 |
| 1b* | <1,560 | 120 | 12.3 | 19.5 | 0.061 | ~0.19 | >20 | >1 |
| 1c* | <1,500 | 110 | 11.1 | 22.0 | 0.063 | >0.19 | <10 | ~1 |
| 2 | <1,500 | 120 | 12.2 | 20.5 | 0.064 | <0.19 | <10 | ~1 |
| 3 | <1,500 | 125 | 12.3 | 20.5 | 0.063 | <0.19 | <20 | ~1 |
| 4 | <1,550 | 125 | 12.2 | 20.5 | 0.063 | <0.19 | <10 | ~1 |
| 5 | <1,550 | 135 | 12.9 | 20.5 | 0.064 | <0.19 | <20 | ~1 |
| 6 | <1,550 | 130 | 12.5 | 20.5 | 0.063 | <0.19 | <10 | ~1 |

*comparative examples

According to Table II, for several of the optical fibers according to the present invention the effective area increases to more than 120 μm² (e.g., 125-135 μm²). An effective area ranging up to 240 μm² may be achieved with an optical fiber profile as previously defined, with a mode field diameter between 11.5 μm and 17 μm. This increase in the effective area certainly causes an increase in the effective cutoff wavelength, which nevertheless remains limited to 1600 nm. The optical fiber according to the present invention thus retains its single-mode operation in the C band (i.e., 1530 nm to 1565 nm). As noted, the optical fiber according to the present invention with the profile as previously defined may have an effective cutoff wavelength between 1350 nm and 1600 nm.

As also noted in Table II, the bending and microbending losses of the optical fiber according to the present invention are equivalent or better than the bending and microbending losses of a conventional SSMF. Furthermore, the optical fiber according to the present invention has equivalent (or better) attenuation compared with a conventional SSMF (i.e., attenuation equal to or less than 0.19 dB/km at a wavelength of 1550 nm).

Moreover, the dispersion and dispersion slope values of the optical fiber according to the present invention could be limited to 21.5 ps/(nm·km) and 0.065 ps/(nm²·km), respectively, at a wavelength of 1550 nm. Notably, a chromatic dispersion between 16 ps/(nm·km) and 21.5 ps/(nm·km) and a dispersion slope between 0.050 ps/(nm²·km) and 0.065 ps/(nm²·km) may be achieved with an optical fiber having the profile described previously. Those having ordinary skill in the art will appreciate that this limitation of the chromatic dispersion is important for limiting the length of dispersion compensation fibers, which introduce a further attenuation in the transmission system.

Comparative Examples 1b and 1c fall outside the scope of the invention. Example 1b has the same central core as Example 1 but does not have a depressed cladding. The inner cladding corresponds to the refractive index of the outer cladding (i.e., pure silica). The absence of a depressed cladding causes an increase in the effective cutoff wavelength beyond 1550 nm. Furthermore, the absence of a depressed cladding in Example 1b causes an increase in bending and microbending losses.

Example 1c also has the same central core as Example 1 and a same depressed cladding as Example 1, but the depressed cladding is too close to the central core (i.e., the annular width of the intermediate cladding is too narrow). In this regard, the thickness of the intermediate cladding separating the depressed cladding from the central core is less than 5 μm. Consequently, the fundamental mode propagating in the central core is influenced by the depressed cladding, which causes a smaller effective area (<120 μm²), and an increase in the chromatic dispersion (>21.5 ps/(nm·km)).

The transmission optical fiber according to the present invention is particularly suitable for long distance transmission systems in the C band (i.e., 1530 nm to 1565 nm). By increasing the effective area, without any notable degradation of the other optical parameters of the optical fiber, it is possible to increase the power of transmitted optical signals without increasing the undesirable non-linear effects. The signal-to-noise ratio of the transmission line is thereby improved, which is particularly desirable in terrestrial or submarine, long-distance optical transmission systems.

Furthermore, the optical fiber according to the present invention complies with the recommendations of the ITU-T G.654.B standard, which notably recommends an effective cutoff wavelength ($\lambda_{Ceff}$) between 1350 nm and 1600 nm, and/or a cable cutoff wavelength ($\lambda_{cc}$) of less than 1530 nm, a mode field diameter between 9.5 μm and 13 μm, a chromatic dispersion of less than 22 ps/(nm·km) and a dispersion slope of less than 0.070 ps/(nm²·km), and a cable attenuation of less than 0.22 dB/km. Accordingly, the optical fiber according to the present invention may be installed in many existing transmission systems with good compatibility with the other system optical fibers.

This application incorporates entirely by reference the following commonly assigned patent documents, each of which discusses optical fibers: U.S. Patent Application Publication No. US 2007/0258686 A1 and its related U.S. patent application Ser. No. 11/743,365 for a Chromatic Dispersion Compensating Fiber, filed May 2, 2007, now U.S. Pat. No. 7,356,234; U.S. patent application Ser. No. 11/934,451 for a Chromatic Dispersion Compensating Fiber, filed Nov. 2, 2007; and U.S. patent application Ser. No. 11/999,333 for an Optical Fiber, filed Dec. 4, 2007

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A transmission optical fiber, comprising:
a central core having a radius $r_1$;
an intermediate cladding having a radius $r_2$, said intermediate cladding surrounding said central core;
a depressed cladding having a radius $r_3$, said depressed cladding surrounding both said intermediate cladding and said central core; and
an outer optical cladding surrounding said depressed cladding, said intermediate cladding, and said central core;
wherein the refractive index difference ($\Delta n_3$) between said depressed cladding and said outer optical cladding is less than the refractive index difference ($\Delta n_2$) between said intermediate cladding and said outer optical cladding;

wherein the refractive index difference ($\Delta n_3$) between said depressed cladding and said outer optical cladding is less than about $-3.5 \times 10^{-3}$; and wherein said optical fiber possesses (i) an effective area ($S_{eff}$) of more than about 120 μm² at a wavelength of 1550 nm and (ii) an effective cutoff wavelength ($\lambda_{Ceff}$) of less than 1600 nm.

2. An optical fiber according to claim 1, wherein said central core's radius ($r_1$) is more than 5.5 μm.

3. An optical fiber according to claim 1, wherein said central core's radius ($r_1$) is between about 5.5 μm and 7.5 μm.

4. An optical fiber according to claim 1, wherein said intermediate cladding's radius ($r_2$) is between about 10.5 μm and 14.0 μm.

5. An optical fiber according to claim 1, wherein said depressed cladding's radius ($r_3$) is between about 11.5 μm and 16 μm.

6. An optical fiber according to claim 1, wherein the refractive index difference ($\Delta n_t$) between said central core and said outer optical cladding is less than about $5.0 \times 10^{-3}$.

7. An optical fiber according to claim 1, wherein the refractive index difference ($\Delta n_t$) between said central core and said outer optical cladding is between $3.0 \times 10^{-3}$ and $5.0 \times 10^{-3}$.

8. An optical fiber according to claim 1, wherein the refractive index difference ($\Delta n_2$) between said intermediate cladding and said outer optical cladding is between about $-1.0 \times 10^{-3}$ and $1.0 \times 10^{-3}$.

9. An optical fiber according to claim 1, wherein the refractive index difference ($\Delta n_2$) between said depressed cladding and said outer optical cladding is between about $-15.0 \times 10^{-3}$ and $-5.0 \times 10^{-3}$.

10. An optical fiber according to claim 1, wherein the width ($r_2-r_1$) of said intermediate cladding is more than 5 μm.

11. An optical fiber according to claim 1, wherein the width ($r_2-r_1$) of said intermediate cladding between about 5 μm and 8 μm.

12. An optical fiber according to claim 1, wherein the width ($r_3-r_2$) of said depressed cladding is less than 5 μm.

13. An optical fiber according to claim 1, wherein the width ($r_3-r_2$) of said depressed cladding is between about 1 μm and 5 μm.

14. An optical fiber according to claim 1, wherein, at a wavelength of 1550 nm, said optical fiber has a mode field diameter ($2W_{02}$) of more than about 11.5 μm.

15. An optical fiber according to claim 1, wherein, at a wavelength of 1550 nm, said optical fiber has a chromatic dispersion of less than about 21.5 ps/(nm·km).

16. An optical fiber according to claim 1, wherein, at a wavelength of 1550 nm, said optical fiber has a chromatic dispersion slope of less than about 0.065 ps/(nm²·km).

17. An optical fiber according to claim 1, wherein, at a wavelength of 1550 nm, said optical fiber has an attenuation of equal to or less than 0.19 dB/km.

18. An optical fiber according to claim 1, wherein, at a wavelength of 1625 nm, said optical fiber has bending losses of less than about 20 dB/m for a bending radius of 10 mm.

19. An optical fiber according to claim 1, wherein, at a wavelength of 1550 nm, said optical fiber has substantially equivalent or better microbending losses than a standard single-mode fiber (SSMF) when subjected to identical stresses, wherein:

at a wavelength of 1310 nanometers, the comparative standard single-mode fiber (SSMF) has a mode field diameter with nominal values of between 8.6 microns and 9.5 microns and a tolerance of ±0.6 micron;

the comparative standard single-mode fiber (SSMF) has a cable cutoff wavelength of no more than 1260 nanometers;

the comparative standard single-mode fiber (SSMF) has a zero chromatic dispersion wavelength of at least 1300 nanometers and no more than 1324 nanometers;

at the zero chromatic dispersion wavelength, the comparative standard single-mode fiber (SSMF) has a zero chromatic dispersion slope of no more than 0.092 ps/(nm²·km);

at a wavelength of 1550 nanometers, the comparative standard single-mode fiber (SSMF) has macrobending losses of no more than 0.1 dB for 100 turns around a mandrel radius of 30 millimeters; and at a wavelength of 1625 nanometers, the comparative standard single-mode fiber (SSMF) has macrobending losses of no more than 0.1 dB for 100 turns around a mandrel radius of 30 millimeters.

20. An optical fiber according to claim 1, further comprising at least one additional cladding layer positioned between said depressed cladding and said outer optical cladding.

21. An optical fiber, comprising:

a central core having a radius $r_1$ that is more than about 5.5 μm;

an intermediate cladding having a radius $r_2$, said intermediate cladding surrounding said central core, wherein the annular width ($r_2-r_1$) of said intermediate cladding is more than about 5 μm;

a depressed cladding having a radius $r_3$, said depressed cladding surrounding both said intermediate cladding and said central core, wherein the width ($r_3-r_2$) of said depressed cladding is less than about 5 μm; and an outer optical cladding surrounding said depressed cladding, said intermediate cladding, and said central core;

wherein the refractive index difference ($\Delta n_t$) between said central core and said outer optical cladding is less than about $5.0 \times 10^3$;

wherein the refractive index difference ($\Delta n_3$) between said depressed cladding and said outer optical cladding is less than about $-3.5 \times 10^{-3}$; and wherein said optical fiber possesses an effective cutoff wavelength ($\lambda_{Ceff}$) of less than 1600 nm.

22. An optical fiber according to claim 21, wherein the refractive index difference ($\Delta n_2$) between said intermediate cladding and said outer optical cladding is between about $-1.0 \times 10^{-3}$ and $1.0 \times 10^{-3}$.

23. An optical fiber according to claim 21, wherein, at a wavelength of 1550 nm, said optical fiber possesses an effective area ($S_{eff}$) of between 120 μm² and 240 μm².

24. An optical fiber according to claim 21, wherein, at a wavelength of 1550 nm, said optical fiber possesses a mode field diameter ($2W_{02}$) of between 11.5 μm and 17 μm.

25. An optical fiber according to claim 21, further comprising an additional cladding layer positioned between said depressed cladding and said outer optical cladding.

26. An optical fiber according to claim 21, wherein the central core has a step refractive-index profile.

27. An optical fiber according to claim 21, wherein the refractive index difference ($\Delta n_3$) between said depressed cladding and said outer optical cladding is less than the refractive index difference ($\Delta n_2$) between said intermediate cladding and said outer optical cladding.

* * * * *